United States Patent
Frost (10) Patent No.: US 10,556,811 B2
(45) Date of Patent: Feb. 11, 2020

(54) FUEL FLOW SYSTEM

(71) Applicant: AIRBUS OPERATIONS LIMITED, Bristol (GB)

(72) Inventor: Neil Terence Frost, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 15/496,240

(22) Filed: Apr. 25, 2017

(65) Prior Publication Data
US 2017/0305763 A1     Oct. 26, 2017

(30) Foreign Application Priority Data

Apr. 25, 2016 (GB) .................................. 1607167.2

(51) Int. Cl.
*C02F 1/44* (2006.01)
*B01D 71/02* (2006.01)
*B64D 37/02* (2006.01)
*B64D 37/32* (2006.01)

(52) U.S. Cl.
CPC .............. *C02F 1/44* (2013.01); *B01D 71/021* (2013.01); *B01D 71/024* (2013.01); *B64D 37/02* (2013.01); *B64D 37/32* (2013.01)

(58) Field of Classification Search
None
See application file for complete search history.

(56) References Cited

U.S. PATENT DOCUMENTS 3,048,275 A  *  8/1962  Headrick .............. B01D 17/045
                                                    210/247
4,886,603 A  *  12/1989  Taylor .................... B01D 17/02
                                                    210/641

(Continued)

FOREIGN PATENT DOCUMENTS

GB      2521237 A      6/2015
GB      2538543 A      11/2016

(Continued)

OTHER PUBLICATIONS

R.R. Nair et al., "Unimpeded Permeation of Water Through Helium-Leak-Tight Graphene-Based Membranes", Science, Jan. 27, 2012, vol. 335, No. 6067, pp. 442-444, DOI:10.1126/science.1211694.

(Continued)

*Primary Examiner* — Bradley R Spies
(74) *Attorney, Agent, or Firm* — Nixon & Vanderhye P.C.

(57) ABSTRACT

The present application relates to a fuel flow system. In particular, the application relates to a fuel flow system for an aircraft. The fuel flow system has a fuel conduit having a fuel inflow and a fuel outflow along which a fuel/water mix is configured to flow from the fuel inflow to the fuel outflow. The fuel conduit is fluidly communicable with a fuel tank. A peripheral conduit surrounds at least part of the fuel conduit. A water-permeable member is disposed between the fuel conduit and the peripheral conduit. The water-permeable member enables water from the fuel/water mix to flow through the water-permeable member from the fuel conduit into the peripheral conduit, but at least substantially prevents liquid fuel from the fuel/water mix from doing so.

17 Claims, 3 Drawing Sheets

(56) References Cited

U.S. PATENT DOCUMENTS

| | | | |
|---|---|---|---|
| 6,029,629 A | 2/2000 | Tipton | |
| 2002/0100726 A1* | 8/2002 | Spearman | B01D 17/04 |
| | | | 210/640 |
| 2003/0121860 A1 | 7/2003 | Harenbrock et al. | |
| 2010/0224549 A1* | 9/2010 | Micke | B01D 29/356 |
| | | | 210/321.65 |
| 2012/0042855 A1* | 2/2012 | Vogely | F02M 37/0052 |
| | | | 123/498 |
| 2015/0122814 A1* | 5/2015 | Tichborne | B64D 37/32 |
| | | | 220/88.3 |
| 2015/0231577 A1* | 8/2015 | Nair | B01D 71/024 |
| | | | 210/640 |
| 2015/0328565 A1* | 11/2015 | Swaminathan | B01D 17/045 |
| | | | 210/489 |
| 2015/0354710 A1 | 12/2015 | Richardson et al. | |
| 2016/0074813 A1 | 3/2016 | Sjungargard et al. | |
| 2016/0339453 A1 | 11/2016 | Lam et al. | |
| 2016/0341162 A1 | 11/2016 | Lam et al. | |

FOREIGN PATENT DOCUMENTS

| | | |
|---|---|---|
| GB | 2538707 A | 11/2016 |
| WO | 2014174247 A1 | 10/2014 |

OTHER PUBLICATIONS

UKIPO Search Report dated Oct. 3, 2016 Great Britain Application No. 1607167.2.

\* cited by examiner

FUEL FLOW SYSTEM

RELATED APPLICATIONS

The present application claims priority from Great Britain Application No. 1607167.2, filed Apr. 25, 2016, the disclosure of which is hereby incorporated by reference herein in its entirety.

FIELD OF THE INVENTION

The present invention relates to a fuel flow system, typically but not exclusively an aircraft fuel flow system.

BACKGROUND OF THE INVENTION

Water contamination in aircraft fuel systems can cause many problems. In particular, water contamination in fuel is known to collate in aircraft fuel tanks. When an aircraft reaches altitude during operation, the ambient temperature drops to around −50° C. which can lead to ice formation. Water contamination in aircraft fuel systems typically occur due to water in fuel being fed into an aircraft fuel system upon the supply of fuel to the aircraft, or through venting in the fuel system.

The presence of water in a fuel tank can lead to the growth of microbiological contamination (MBC), which may lead to the clogging of fuel system components, such as filters, fuel pumps and gauges. The formation of ice during operation of an aircraft at altitude may also cause similar problems. As such, it is desirable to remove water from a fuel tank before such problems occur.

One known method for removing water from a fuel system is to locate a water drain valve at the base of a fuel tank. However, such water drain valves are typically unable to discriminate between water and fuel such that either insufficient water is drained from the fuel tank, or fuel is removed from the fuel tank together with the water. Moreover, it is necessary for an operator to manually operate the drain valve, or to use a complicated system to open and close the valve. Such a waste fuel/water mix should be disposed of in an appropriate manner.

WO2014/174247 describes a tank assembly with a tank for storing liquid hydrocarbon, the tank having a floor for supporting a weight of the liquid hydrocarbon. A filter is fitted to the floor of the tank. The filter in arranged to allow liquid water in the tank to drain out of the tank through the filter but substantially prevent the liquid hydrocarbon in the tank from doing so. The filter has a permeation member such as a membrane, which is formed from a material such as graphene oxide which allows liquid water in the tank to drain out of the tank by permeating through the permeation member but substantially prevents the liquid hydrocarbon in the tank from doing so.

"Unimpeded. Permeation of Water Through Helium-Leak-Tight Graphene-Based Membranes", R. R Nair et al, Science, 27 Jan. 2012, Vol. 335, no. 6067, pp. 442-444, DOI:10.1126/Science.1211694 demonstrated that submicrometer-thick membranes made from graphene oxide can be completely impermeable to liquid, vapours, and gasses, including helium, but these membranes allow unimpeded permeation of water.

SUMMARY OF THE INVENTION

According to a first embodiment of the invention, there is provided a fuel flow system comprising: a fuel conduit having a fuel inflow and a fuel outflow along which a fuel/water mix is configured to flow from the fuel inflow to the fuel outflow, the fuel conduit being fluidly communicable with a fuel tank, a peripheral conduit surrounding at least part of the fuel conduit, a water-permeable member between the fuel conduit and the peripheral conduit which enables water from the fuel/water mix to flow through the water-permeable member from the fuel conduit into the peripheral conduit, but at least substantially prevents liquid fuel from the fuel/water mix from doing so.

A pressure differential may be generated between the fuel conduit and the peripheral conduit so that the pressure on the peripheral conduit side of the water-permeable member is lower than the pressure on the fuel conduit side of the water-permeable member.

The fuel flow system may further comprise a pressure differential generating device configured to generate a pressure differential across the water-permeable member.

The pressure differential generating device may comprise a pressure reduction device configured to reduce the pressure of a fluid in the peripheral conduit.

The pressure reduction device may be a fluid pump.

The pressure differential generating device may comprise a fuel pump configured to increase the pressure of the fuel/water mix flowing along the fuel conduit.

The fuel flow system may further comprise a barrier defined between the fuel conduit and the peripheral conduit, wherein the water-permeable member is at least part of the barrier.

The barrier may be formed by a wall of the fuel conduit.

The fuel conduit may be a fuel pipe with the fuel inflow at one end and the fuel outflow at the other end.

The fuel flow through the fuel conduit may be substantially linear flow.

The peripheral conduit may be a sump or may communicate with a sump.

The peripheral conduit may extend circumferentially around at least a section of the fuel conduit.

The water-permeable member may comprise graphene oxide.

The water-permeable member may comprise a graphene oxide membrane.

The water-permeable member may comprise a water-permeable material and a support layer to support the water-permeable material.

The support layer may be a porous substrate.

The fuel conduit may comprise at least two fuel conduit sections, and the peripheral conduit may surround at least part of each of the at least two fuel conduit sections.

The at least two fuel conduit sections may form parallel flow paths.

The fuel flow system may further comprise a fuel tank wherein the fuel conduit fluidly communicates with the fuel tank. The fuel tank may be an aircraft fuel tank. The fuel tank may be a fuel supply tank for supplying fuel to an aircraft.

Fuel from the fuel outflow may be fed to the fuel tank.

The fuel outflow may be the fuel tank inlet.

The fuel conduit may comprise part of a fuel delivery system to a fuel tank.

Fuel to the fuel inflow may be fed from the fuel tank.

The fuel inflow may be the fuel tank outlet.

The fuel conduit may be part of a fuel recirculation system for recirculating fuel in the fuel tank.

The fuel recirculation system may be external from the fuel tank.

The fuel inflow may draw fuel from the fuel tank and the fuel outflow may feed fuel to the fuel tank.

According to another aspect of the invention, there is provided an aircraft comprising the fuel flow system as recited in the claims.

According to another aspect of the invention, there is provided a fuel delivery system comprising the fuel flow system as recited in the claims.

The fuel delivery system may be configured to supply fuel to an aircraft.

The fuel delivery system may further comprise a fuel supply tank and a fuel feed for supplying fuel to an aircraft.

The fuel conduit may be between the fuel supply tank and the fuel feed.

According to another aspect of the invention, there is provided a method of separating water from a fuel flowing through a conduit, the method comprising: feeding a fuel/water mix along a fuel conduit past a water-permeable member which enables water from the fuel/water mix to flow through the water-permeable member into a peripheral conduit, but at least substantially prevents liquid fuel from the fuel/water mix from doing so, and feeding water flowing through the water-permeable member into the peripheral conduit.

The method may further comprise generating a pressure differential between the fuel conduit and the peripheral conduit so that the pressure on the peripheral conduit side of the water-permeable member is lower than the pressure on the fuel conduit side of the water-permeable member.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
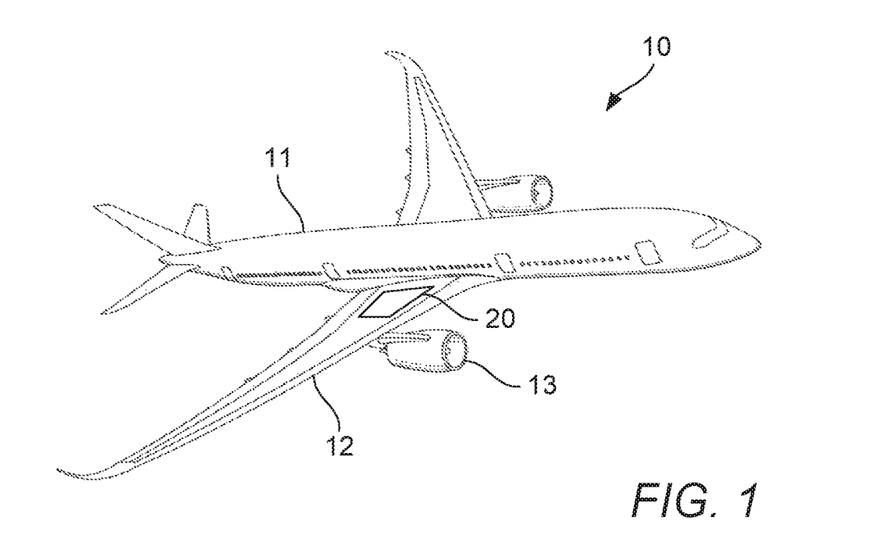
FIG. 1 illustrates an aircraft having a fuel flow system with a fuel tank.
Figure 7:
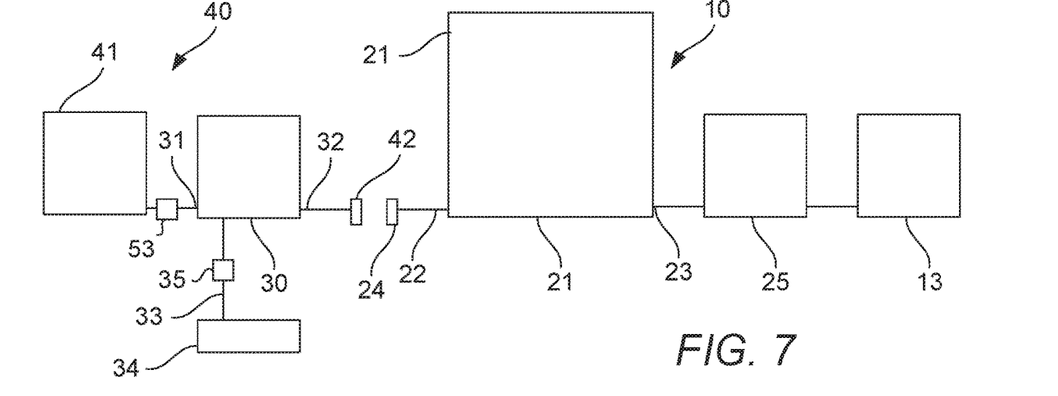
FIG. 7 is a schematic view of an aircraft fuel flow system according to yet another embodiment of the invention.

FIG. 1 shows an aircraft 10. The aircraft 10 has a fuselage 11 carrying a pair of wings 12. Each wing 12 carries as engine 13. The aircraft 10 has a fuel flow system 20. The fuel flow system 20 is configured to supply fuel. In the present embodiment, the fuel flow system 20 is an aircraft fuel flow system which is configured to supply fuel to the engines 13. However, as will be described below, it will be appreciated that the fuel flow system 20 may be independent of the aircraft 10, for example forming a fuel delivery system (as shown in FIG. 7) for supplying fuel to the aircraft 10.

Fuel for each engine 13 is stored in one or more aircraft fuel tanks 21. Fuel for each engine is stored in a centre tank within the fuselage 13 and one or more wing tanks within the wings 12. The description below refers to the aircraft fuel tank 20, which could equally refer to the centre tank, any of the wing tanks, or an alternative fuel tank arrangement.

Figure 2:
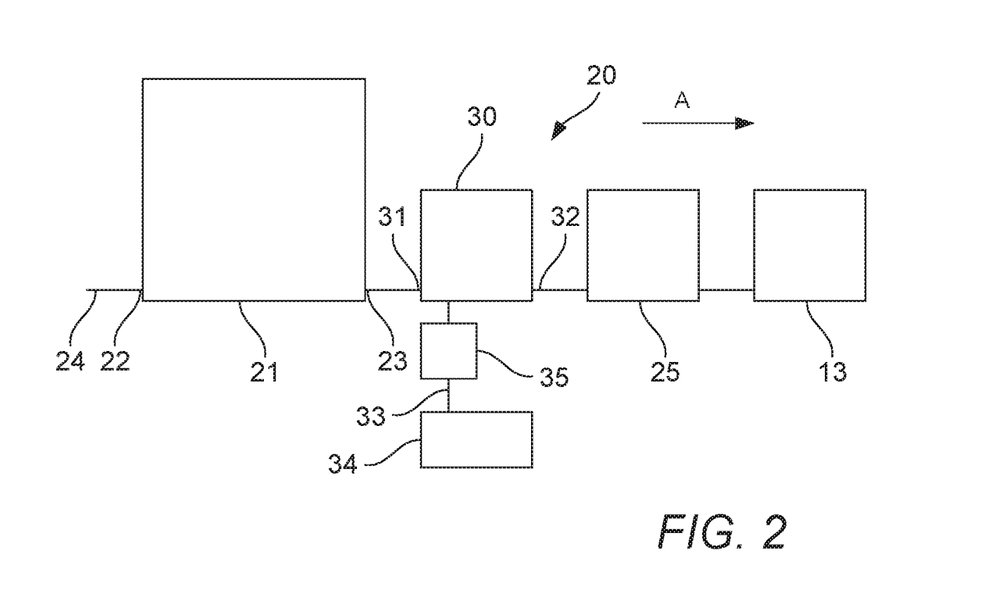
FIG. 2 is a schematic view of an aircraft fuel flow system for an aircraft of FIG. 1.

Referring to FIG. 2, the aircraft fuel tank 21 forms part of the fuel flow system 21. The aircraft fuel tank 21 has a tank inlet 22 through which fuel is fed to the fuel tank 21, and a tank outlet 23 through which fuel is drawn from the fuel tank 21. The tank inlet 22 and tank outlet 23 are formed by fuel lines. An aircraft fuel includes a liquid hydrocarbon fuel, such as kerosene.

The fuel flow system 20 further compromises a fuel supply feed 24 which communicates with the tank inlet 22. The tank outlet 23 is in fluid communication with the or each engine 13 by one or more fuel lines. A fuel pump 25 is in fluid communication with the tank outlet 23 to draw fuel from the tank outlet 23 and feed it to the engine 13.

The fuel tank 21 typically contains a fuel/water mix. That is, water contamination in the fuel is received in the fuel tank 21.

A fuel/water mix separator 30 is received in a fuel line 26 between the fuel tank 21 and the engine 13. In the embodiment shown in FIG. 2 the fuel/water mix separator 30 is disposed upstream of the fuel pump 25, however it will be understood that in an alternative embodiment that the fuel/water mix separator 30 may be disposed downstream of the fuel pump 25.

Aircraft fuel flows along the fuel line 26 from the aircraft fuel tank 21 to the engine 13. That is, the fuel has a fuel flow direction as indicated by arrow A in FIG. 2.

The fuel/water mix separator 30 has an inflow 31 through which the fuel flows into the fuel/water mix separator 30 and an outflow 32 through which the fuel flows from the fuel/water mix separator 30. The fuel/water mix separator 30 is configured to separate water from fuel in the fuel/water mix. The fuel/water mix flows into the fuel/water mix separator 30 through the inflow 31.

Separated fuel, that is fuel separated from water or a fuel/water mix with a higher ratio of fuel to water from that fed into the fuel/water mix separator 30 through the inflow 31, flows from the fuel/water mix separator 30 through the outflow 32.

The fuel/water mix separator 30 comprises a water outlet 33 through which separated water drains. The water outlet 33 comprises a sump 34 in which the separated water is able to be stored before being discarded, or utilised elsewhere.

The fuel/water mix separator 30 also comprises a pressure reduction device 35. The pressure reduction device 35 is configured to generate a reduction in fluid pressure in the fuel/water mix separator 30. The pressure reduction device 35 acts as a pressure differential generating device. The pressure reduction device 35 is shown as part of the water outlet 33 in FIG. 2 however, it will be understood that the pressure reduction device 35 may be independent from the water outlet 33, for example as shown in FIG. 3.

Figure 3:
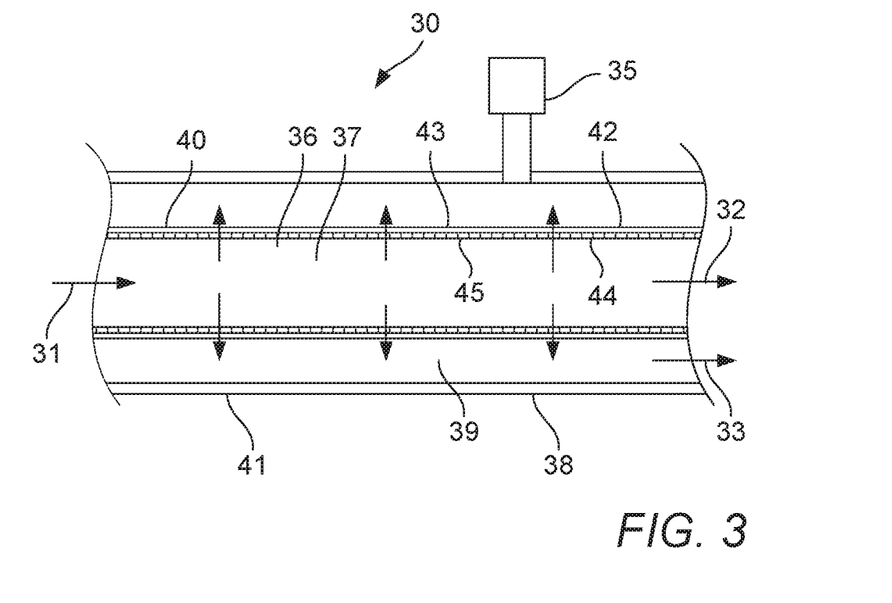
FIG. 3 is a schematic cross sectional view of part of the aircraft fuel flow system of FIG. 2.

Referring now to FIG. 3 the detailed schematic view of part of the fuel/water mix separator 30 is shown. The inflow 31 is shown on the left side of FIG. 3 and the outflow 32 is shown on the right side of FIG. 3. Therefore the fuel flow direction in FIG. 3 is from left to right as shown.

A fuel conduit 36 extends between the inflow 31 and the outflow 32. The fuel/water mix is configured to flow along the conduit 36 between the inflow 31 and the outflow 32. The fuel conduit 36 defines a fuel passage 37. The fuel passage 37 is shown as linear in FIG. 3 however it will be understood that alternative configurations are possible, for example the fuel passage may have a curved path, such as a helical path, a combination of linear and curved portions. The fuel flow through the fuel/water mix separator 30 is a substantially linear flow.

The fuel conduit 36 is a fuel pipe. The fuel conduit 36 is cylindrical, however alternative cross-sectional shapes are, possible.

A peripheral conduit 38 extends around the fuel conduit 36. The peripheral conduit 38 encloses the fuel conduit 36.

The peripheral conduit 38 encloses the fuel conduit 36 to form a housing. The peripheral conduit 38 defines a peripheral passage 39. The peripheral passage 39 extends around the fuel conduit 36.

The fuel conduit 36 is defined by a barrier 40 between the fuel passage 37 and the peripheral passage 39. The peripheral conduit 38 has an outer wall 41. The outer wall 41 is spaced from the barrier 40 to form the peripheral passage 39.

The fuel conduit 36 is defined by the barrier 40. The barrier 40 comprises a water-permeable member 42.

In the present embodiment, as shown in FIG. 3, the water-permeable member 42 forms the barrier 40. However, it will be understood that, in an alternative embodiment, the barrier 40 is formed in part by the water-permeable member 42 and in part by another member. For example, the fuel conduit 36 may be formed by a water-impermeable pipe with one or more openings formed therein, the openings formed in the wall of the pipe being covered by the water-permeable member 42.

Alternatively, the fuel conduit 36 may be formed by a solid pipe member with a water-permeable pipe member extending from one end thereof, for which arrangement a second solid pipe section may extend from the distal end of the water-permeable pipe member.

The water-permeable member 42 is formed from a water-permeable filter material. The filter material forms a permeation layer.

The water-permeable layer 42 further comprises a support structure 44. The permeation layer 43 is carried by the support structure 44, and may be bonded thereto. The permeation layer 43 may be disposed on an outer side of the support structure 44, as shown in FIG. 3, or may be arranged on the inner side. Alternatively, the permeation layer 43 may be sandwiched between a pair of support structures 44.

The support structure 44 comprises a support layer 45. The support layer 45 is formed by a porous substrate. The porous substrate forming the support layer 45 may be formed, for example, by a nylon, metallic or plastic material. Fluid is able to pass through the pores of the porous substrate.

The permeation layer 43 of the water-permeable member 42 enables water to flow through it, but substantially prevent liquid fuel, ice or particular material from doing so. In the present embodiment the permeation member comprises graphene oxide, although other suitable materials may be used. Graphene oxide is typically a layered structure of graphene oxide crystallites. Alternative suitable materials which enable water to flow through it but substantially prevent liquid fall, ice or particulate material from doing so may be used.

The peripheral conduit 38 fluidly communicates with the water outlet 33. Water received in the peripheral conduit 38 flows to the water outlet 33, into the sump 34 for storage. Water in the peripheral conduit 38 is therefore able to be collated for disposed or alternative use. Alternatively, the sump 38 of the water outlet 33 may be omitted.

The pressure reduction device 35 is a suction pump. In FIG. 2 the pressure reduction device 35 is shown inline with the water outlet 33, although it will be understood that alternative arrangements are possible. As an example, in FIG. 3 the pressure reduction device 35 is shown independently of the water outlet 33. In the embodiment shown in FIG. 3 the pressure reduction device 35 communicates directly with the peripheral passage 39 of the peripheral conduit 38.

The pressure reduction device 35 is configured to generate a pressure reduction in the peripheral passage 39. That is, the pressure reduction device 35 is configured to generate a pressure differential between the fuel passage 37 and the peripheral passage 39. As such, it is possible to cause a pressure differential across the water-permeable member 42 so that the fluid pressure in the fuel passage 37 is greater than the fluid pressure in the peripheral passage 39.

The pressure reduction device 35 is a suction pump, and may take different forms. A simple fluid pump may be used, or alternatively pressure reduction devices such as an aspirator, or indirectly communicating the peripheral passage with atmospheric pressure outside the aircraft during operation of the aircraft at altitude, may be used.

The pressure reduction device 35 may be used to draw water from the peripheral passage 39, for example when inline with the water outlet 33, and or may be configured to draw a gas, such as air from the peripheral passage 39.

During operation, the fuel/water mix is drawn from the aircraft fuel tank 21 by the fuel pump 25. The fuel/water mix flows along fuel line 26 towards the engine 13. The fuel/water mix flows into the fuel/water mix separator 30 through the inflow 31. The fuel/water mix flows through the fuel/water mix separator 30 along the fuel conduit 36. As the fuel/water mix flows along the fuel passage 37 it comes into contact with the water-permeable member 42.

The pressure reduction device 35 is operated to generate a pressure differential across the water-permeable member 42. That is the fluid pressure on the fuel passage side of the water-permeable member 42 is greater than the fluid pressure on the peripheral passage side of the water-permeable member 42. As the fuel/water mix comes into contact with the water-permeable member 42, liquid water in the fuel/water mix passes through the water-permeable member 42.

The pressure differential across the water-permeable member 42 urges the water to be drawn through the water-permeable member 42 such that the ratio of water concentration in the fuel/water mix is reduced. Furthermore, as the fuel/water mix flows along the water-permeable member 42 there is an increased opportunity for the water to come into contact and pass through the water-permeable member 42.

As the fuel conduit 36 forms a cylindrical passage, the available surface area available to provide the water-permeable member 42 is maximised. The flow of the fuel/water mix over the water-permeable member 42 also prevents detritus such as ice or particulate material from clogging up the water-permeable material and preventing the flow of water from the fuel passage 37 into the peripheral passage 39.

The separated fuel flows through the outflow 32 of the fuel/water mix separator 30 to the engine 13. The fuel is unable to pass through the water-permeable member 38, and so cannot pass into the peripheral passage 39.

Water passes through the water-permeable member 42 into the peripheral passage 39 and flows in the peripheral conduit 38 through the water outlet 33 to the sump 34.

By providing a flow of the water/fuel mix over the water-permeable member 42 rather than by providing a static presence of the water/fuel mix, it is possible to prevent microbiological growth on the water-permeable member 42 which would impair the flow of water through the water-permeable member 42.

It will be understood that, by providing a peripheral conduit 38 which encloses a water-permeable member 42 that the water-permeable member 42 is not exposed to atmospheric air during operation of the aircraft 10 at altitude, and so the formation of ice particles due to water flowing through the water-permeable member 42 and coming into contact with low temperature atmospheric air at altitude is prevented. As such the efficiency of the water-permeable member 42 is increased.

It will be understood that, in an alternative embodiment, the pressure differential generated across the water-permeable member 42 may be caused by increasing the fluid pressure of the fuel/water mix flowing in the fuel conduit 36 so that the fluid pressure in the fuel conduit 36 is greater than the fluid pressure in the peripheral conduit 38. The fuel pump 25 may be used to generate an increased fluid pressure in the fluid conduit 36. The fuel pump 25 may act as a pressure differential generating device. In such an embodiment, the pressure reduction device 35 may be omitted.

Figure 4:
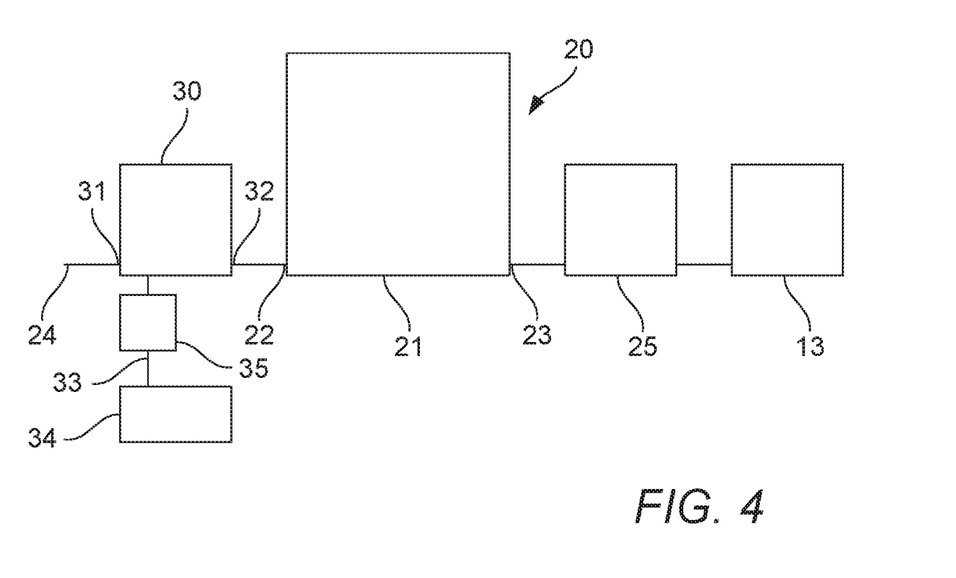
FIG. 4 is a schematic view of an aircraft fuel flow system according to another embodiment of the invention.

An alternative embodiment is shown in FIG. 4. In this embodiment, the fuel/water mix separator 30 is upstream of the aircraft fuel tank 31. That is, fuel flowing from the fuel/water mix separator 30 flows to the aircraft fuel tank 21. The fuel/water mix separator 30 is provided between the fuel supply feed 24 through which fuel is supplied to the aircraft, and the aircraft fuel tank 21. The arrangement of the fuel/water mix separator 30 is generally the same as described above with reference to FIG. 2 and FIG. 3 and so a detailed description will be omitted.

When fuel is fed to the aircraft through the fuel supply feed 24, the fuel/water mix supplied to the aircraft flows through the fuel supply feed 24 towards the aircraft fuel tank 21. The fuel/water mix flows into the fuel/water mix separator 30 through the inflow 31. The fuel/water mix therefore flows over the water-permeable member 42 such that water is drawn through the water-permeable member 42 into the peripheral passage 39 and separated fuel flows through the outflow 32. The separated fuel 32 then flows into the aircraft fuel tank through the tank inlet 22.

As described above, a pressure differential is generated across the water-permeable member 42. The pressure differential across the water-permeable member 42 is generated by the pressure reduction device 35, acting as a pressure differential generating device. Fuel fed into an aircraft is typically fed through the fuel supply feed 24 at an increased pressure by means of a fuel pump. As such, the pressure differential across the water-permeable member 42 is maximised by the fuel/water mix being supplied to the inflow 31 at an increased pressure, together with the pressure reduction device 35 generating a reduced fluid pressure in the peripheral passage 39. With such an arrangement, it will be understood that the pressure reduction device 35 may be omitted.

Water flowing into the peripheral passage 39 through the water-permeable member 32 is fed to the water outlet 33.

With the arrangement shown in FIG. 4 the water in the fuel/water mix supplied to the aircraft is separated prior to reaching the aircraft fuel tank 21. As such, water received in the aircraft fuel tank 21 is minimised. Therefore by removing water prior to the water being received in the fuel tank 21 the concentration of water in the tank is low and problems associated with water condensation and microbiological growth may be prevented.

Figure 5:
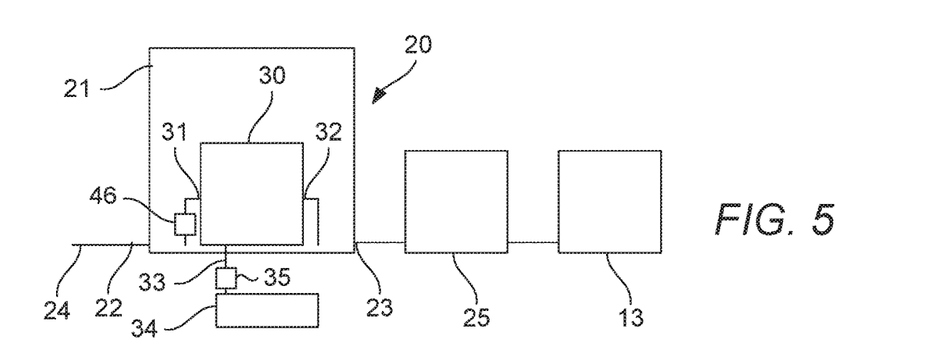
FIG. 5 is a schematic view of an aircraft fuel flow system according to another embodiment of the invention.
Figure 6:
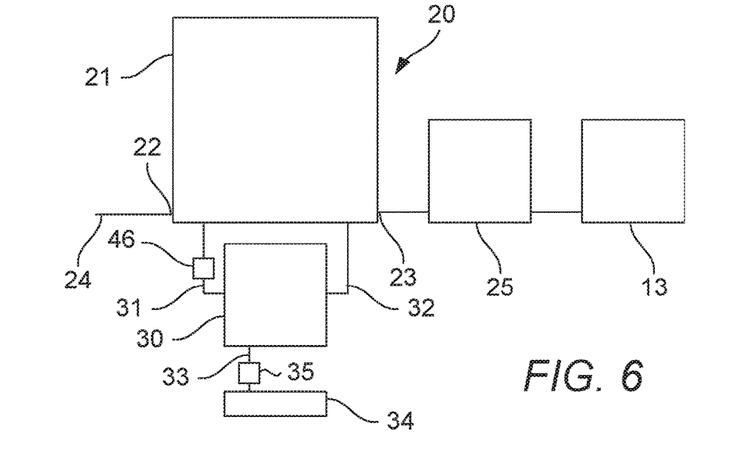
FIG. 6 is a schematic view of an aircraft fuel flow system to another embodiment of the invention.

In alternative embodiments, as shown in FIG. 5 and FIG. 6, fuel/water mix within the fuel tank 21 may be treated to reduce the concentration within the fuel/water mix. The fuel/water mix separator 30 may form part of a recirculation arrangement. The configuration of the fuel flow system 20 and, in particular, the fuel/water mix separator 30 is generally the same as that described above. However, the position of the fuel/water mix separator 30 along the fuel flow system differs. As such, a detailed description of the fuel/water mix separator 30 will be omitted herein.

Referring to FIG. 5, with reference also to FIG. 3, a fuel/water mix is supplied to the fuel tank 21 via the fuel supply feed 24. The fuel/water mix is stored in the fuel tank 21 until it is drawn from the fuel tank 21 through the tank outlet 23 to be fed to the engine 13. The fuel pump 25 is typically used to control the flow of fuel to the engine 13 from the fuel tank 21, although alternative flow control arrangements may be used.

The fuel/water mix separator 30 is received in the fuel tank 21. The inflow 31 communicates directly with fuel/water mix in the fuel tank 21. The outflow 22 communicates directly with the fuel tank 21. As such, the inflow 31 and outflow 32 are conduits or openings which internally communicate in the fuel tank 21. The inflow 31 communicates with the lower end of the fuel tank 21, proximate to the base of the fuel tank 21, due to water having a higher density to aircraft fuel.

A circulating fuel pump 46 is disposed along the flow path of the fuel/water mix separator 30. In FIG. 5 the circulating fuel pump 46 is shown disposed on the inflow 31, however it will be understood that alternative arrangements are envisaged, for example the circulating fuel pump 46 may be disposed on the outflow 32. The circulating fuel pump generates a fluid flow through the fuel/water mix separator 30. The circulating fuel pump may act as a pressure differential generating device.

The water outlet 33 feeds water separated by the fuel/water mix separator 30 externally from the fuel tank 21. In FIG. 5, the sump 34 of the water outlet 33 is external to the fuel tank 31.

During operation of the fuel/water mix separator 30, fuel/water mix in the fuel tank 21 is circulated through the fuel/water mix separator 30. During circulation of the fluid, fuel/water mix is drawn in through the inflow 31 to pass along the fuel conduit 36. The fuel/water mix therefore comes into contact with the water-permeable member 42 and water is drawn through the water-permeable member 42.

The suction pump, acting as the pressure reduction device 35, generates a pressure differential across the water-permeable member 42. Alternatively, or in combination with the pressure reduction device 35, the circulating fuel pump 36 may generate or increase the pressure differential across the water-permeable member 42.

A flow restriction along the flow path of the fuel/water mix separator may be used to generate an increased pressure in the flow path of the fuel/water mix separator 30.

Separated fuel passes from the fuel conduit 36 through the outflow 32 and returns into the fuel tank 21. The water drawn through the water-permeable member 42 is fed from the fuel tank by the water outlet 33. As such, the concentration of water in the fuel tank 21 is constantly reduced during operation of the fuel/water mix separator 30.

It will be understood that use of a circulating fuel pump 46, optionally with a flow restriction, may be used with alternative embodiment.

The embodiment shown in FIG. 6 is generally the same as the embodiment of FIG. 5, except that the fuel/water mix separator 30 is disposed outside of the fuel tank 21 with the inflow 31 and the outflow 32 communicating directly with the fuel tank 21. Alternatively, the outflow 32 may communicate with the tank inlet 22. Similarly, the inflow 31 may communicate with the tank outlet 23. The circulating fuel pump 46 is disposed to circulate fuel/water mix in the fuel tank 21 through the fuel/water mix separator 30. It will be understood that in embodiments the fuel pump 25 may be used to achieve this operation. The inflow 31 communicates with the lower end of the fuel tank 21.

Alternative embodiments are envisaged. For example, in one embodiment the fuel/water mix separator 30 is disposed in a fuel line between two independent aircraft fuel tanks 21. As such, the water concentration in the fuel/water mix is reduced when the fuel is fed between the fuel tanks 21.

In the above described embodiments the fuel flow system 20, and in particular the fuel/water mix separator 30, is disposed on the aircraft 10. However, in embodiments the fuel/water mix separator 30 may form part of a fuel delivery system for supplying fuel to the aircraft and not be located on the aircraft itself. Referring now to FIG. 7 a fuel delivery system 50 is shown for supplying fuel to the aircraft 10. The fuel delivery system 50 is a fuel flow system. The fuel delivery system 50 comprises a fuel supply tank 51, in which a fuel/water mix to be supplied to the aircraft 10 is received, and a fuel output feed 52 for connecting to the aircraft through which fuel is supplied to the aircraft 10.

The fuel delivery system 50 comprises the fuel/water mix separator 30. The arrangement of the fuel/water mix separator 30 is generally the same as described above with reference, in particular, to FIG. 3 and so a detailed description will be omitted herein.

The fuel delivery system 50 comprises a fuel supply pump 53 to draw fuel from the fuel supply tank 51 and supply it to the fuel output feed 52 under pressure. However it will be understood that the fuel supply pump 53 may be omitted. The fuel supply pump 53 may generate an increased fluid pressure in the fuel conduit 36 of the fuel/water mix separator 30.

The fuel/water mix separator 30 is disposed in a fuel line between the fuel supply tank 51 and the fuel output feed 52. That is, the fuel/water mix separator 30 is upstream of the fuel output feed 52 and downstream of the supply fuel tank 51. It will be understood that alternative arrangements may be used. For example, the fuel/water mix separator 30 may be disposed in the fuel supply tank 51 in an arrangement corresponding to FIG. 5, or form a recirculating circuit external to the supply fuel tank 51 corresponding to that shown in FIG. 6.

An advantage of the arrangement in which the fuel/water mix separator 30 is disposed upstream of the fuel output feed 52, is that the water is separated from the fuel/water mix immediately prior to the fuel being supplied to the aircraft. With the arrangement in which the fuel/water mix separator 30 is based on the fuel delivery system 50 for an aircraft, it is possible to minimise the concentration of water in the fuel/water mix supply to the aircraft prior to the fuel/water mix being fed to the aircraft. As such the concentration of water in the fuel/water mix received by the aircraft is minimised.

The fuel/water mix separator 30 also comprises the pressure reduction device 35 for generating the differential across the water-permeable member 42. When the fuel output feed 52 is connected to the fuel supply feed 24 of the aircraft 10, fuel/water mix flows from the supply fuel tank 51 through the fuel/water mix separator 30 to the aircraft 10. Water is extracted from the fuel/water mix and flows through the water outlet 33 without being supplied to the aircraft. This water can then be drained.

Although in the above described embodiments, the fuel conduit defines a single flow path between the fuel inflow and fuel outflow, it will be understood that alternative arrangements are possible. For example, in one arrangement the fuel conduit defines parallel flow paths between the inflow and outflow. The fuel conduit comprises two, or more, fuel conduit sections. Such fuel conduit sections extend parallel to each other between the inflow and outflow. The peripheral conduit surround at least part of each of the two, or more, fuel conduit sections.

Although the invention has been described above with reference to one or more preferred embodiments, it will be appreciated that various changes or modifications may be made without departing from the scope of the invention as defines in the appended claims.

The invention claimed is:

1. A fuel flow system, comprising:
   a fuel conduit having a fuel inflow and a fuel outflow along which a fuel/water mix is configured to substantially linearly flow from the fuel inflow to the fuel outflow, the fuel conduit being fluidly communicable with a fuel tank,
   a peripheral conduit enclosing at least part of the fuel conduit forming a peripheral passage,
   a barrier,
   a water-permeable member, wherein the barrier is formed in part by the water-permeable member and in part by a water-impermeable member between the fuel conduit and the peripheral conduit,
   wherein the water-permeable member extends lengthwise along the fuel conduit and enables water from the fuel/water mix to flow through the water-permeable member-from the fuel conduit into the peripheral conduit, wherein the peripheral conduit is configured to substantially linearly flow in the same direction as the fuel/water mix, but at least substantially prevents liquid fuel from the fuel/water mix from doing so.

2. The fuel flow system according to claim 1, wherein a pressure differential is generated between the fuel conduit and the peripheral conduit so that the pressure on the peripheral conduit side of the water-permeable member is lower than the pressure on the fuel conduit side of the water-permeable member.

3. The fuel flow system according to claim 2, further comprising a pressure differential generating device configured to generate a pressure differential across the water-permeable member.

4. The fuel flow system according to claim 3, wherein the pressure differential generating device comprises a pressure reduction device configured to reduce the pressure of a fluid in the peripheral conduit and, optionally, wherein the pressure reduction device is a fluid pump.

5. The fuel flow system according to claim 3, wherein the pressure differential generating device comprises a fuel pump configured to increase the pressure of the fuel/water mix flowing along the fuel conduit.

6. The fuel flow system according to claim 1, wherein the fuel conduit is a fuel pipe with the fuel inflow at one end and the fuel outflow at the other end.

7. The fuel flow system according to claim 1, wherein the peripheral conduit extends circumferentially around at least a section of the fuel conduit.

8. The fuel flow system according to claim 1, wherein the water-permeable member comprises graphene oxide and, optionally, wherein the water-permeable member comprises a graphene oxide membrane.

9. The fuel flow system according to claim 1, further comprising a fuel tank, wherein the fuel conduit fluidly communicates with the fuel tank.

10. The fuel flow system according to claim 9, wherein fuel from the fuel outflow is fed to the fuel tank.

11. The fuel flow system according to claim 9, wherein fuel to the fuel inflow is fed from the fuel tank.

12. The fuel flow system according to claim 9, wherein the fuel conduit is part of a fuel recirculation system for recirculating fuel in the fuel tank.

13. An aircraft comprising the fuel flow system according to claim 1.

14. A fuel delivery system comprising the fuel flow system according to claim 1.

15. The fuel delivery system according to claim 14 configured to supply fuel to an aircraft.

16. A method of separating water from a fuel flowing through a conduit, the method comprising:
feeding a substantially linear flow of fuel/water mix along a fuel conduit past a water-permeable member disposed between the fuel conduit and a peripheral conduit, the water-permeable member extending lengthwise along the fuel conduit,
a barrier, wherein the barrier is formed in part by the water-permeable member and in part by a water-impermeable member between the fuel conduit and the peripheral conduit,
wherein the peripheral conduit encloses at least part of the fuel conduit forming a peripheral passage,
wherein the water-permeable member enables water from the fuel/water mix to flow through the water-permeable section into the peripheral conduit, wherein the peripheral conduit is configured to substantially linearly flow in the same direction as the fuel/water mix, but at least substantially prevents liquid fuel from the fuel/water mix from doing so, and
feeding water flowing through the water-permeable member into the peripheral conduit.

17. The method of claim 16, further comprising: generating a pressure differential between the fuel conduit and the peripheral conduit so that the pressure on the peripheral conduit side of the water-permeable member is lower than the pressure on the fuel conduit side of the water-permeable member.

* * * * *